No. 655,097. Patented July 31, 1900.
J. LATTIN.
MACHINE FOR MAKING GRASS TWINE.
(Application filed Apr. 26, 1899.)
(No Model.) 2 Sheets—Sheet 1.

Witnesses.
Wm. M. Rheem.
Edward Barrett.

Inventor
Judson Lattin
by Brown & Darby
attys.

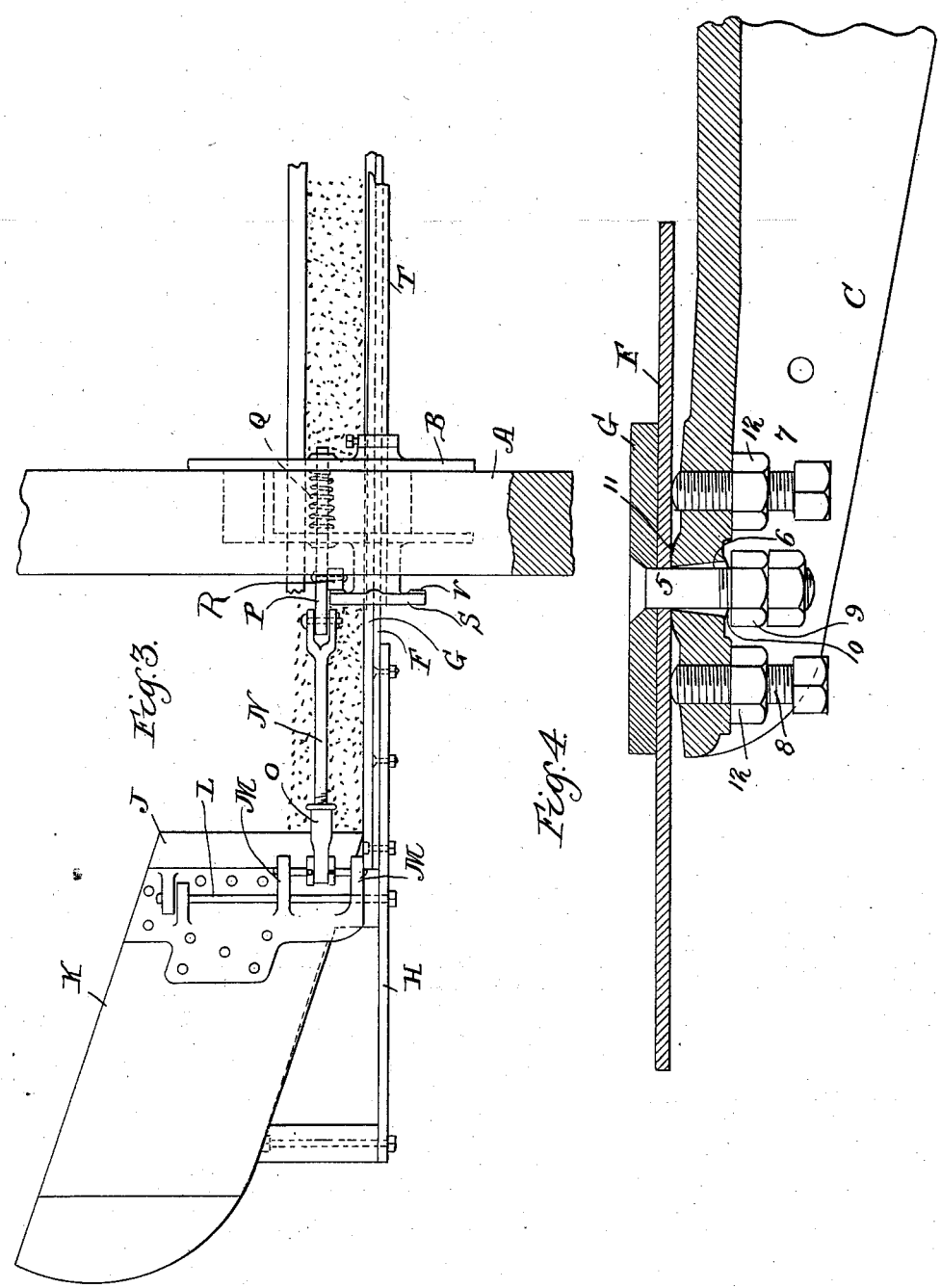

UNITED STATES PATENT OFFICE.

JUDSON LATTIN, OF ST. PAUL, MINNESOTA, ASSIGNOR TO THE NORTH-WESTERN GRASS TWINE COMPANY, OF SAME PLACE.

MACHINE FOR MAKING GRASS TWINE.

SPECIFICATION forming part of Letters Patent No. 655,097, dated July 31, 1900.

Application filed April 26, 1899. Serial No. 714,487. (No model.)

*To all whom it may concern:*

Be it known that I, JUDSON LATTIN, a citizen of the United States, residing at St. Paul, in the county of Ramsey and State of Minnesota, have invented a new and useful Improvement in Machines for Making Grass Twine, of which the following is a specification.

This invention relates to machines for making grass twine and embraces certain features of improvement upon the construction shown, described, and claimed in the pending application of George A. Lowry, Serial No. 643,768, filed July 7, 1897.

One object of the invention is to provide means for evening the butt-ends of the stalks or stems of grass.

A further object of the invention is to provide means whereby the feed of the grass to the twine-forming mechanism may be suitably adjusted and regulated.

Other objects of the invention will appear more fully hereinafter.

The invention consists, substantially, in the construction, combination, location, and arrangement of parts, all as will be more fully hereinafter set forth, as shown in the accompanying drawings, and finally specifically pointed out in the appended claims.

Figure 1:
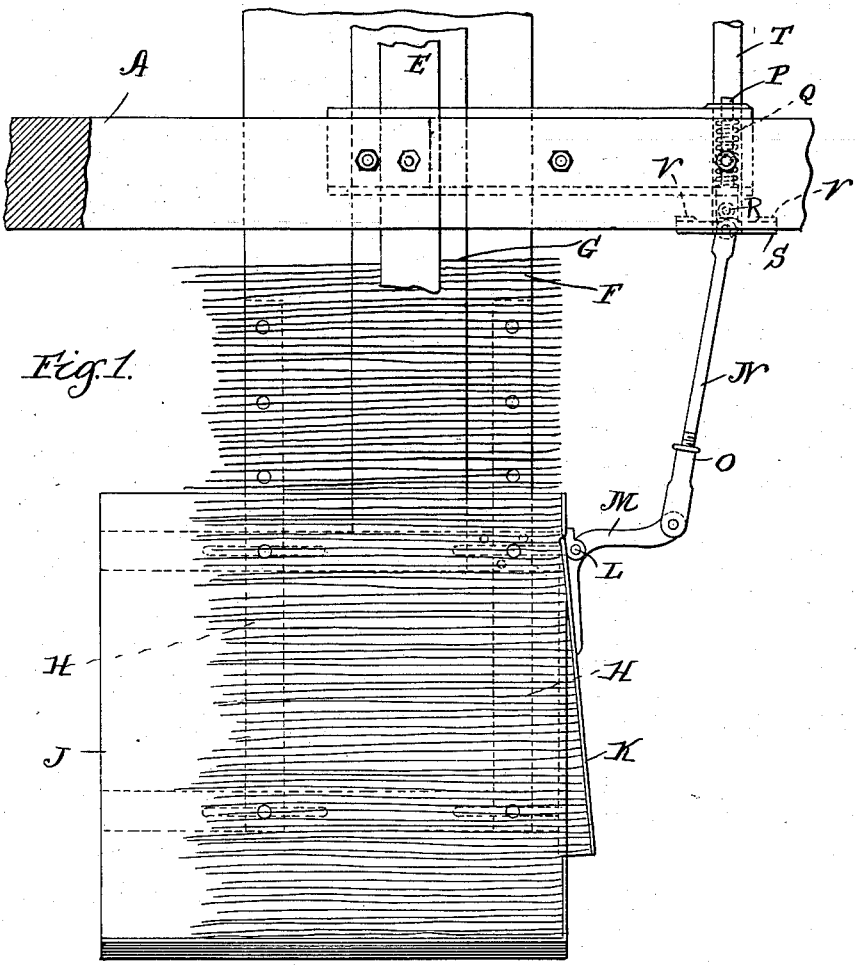
Figure 2:
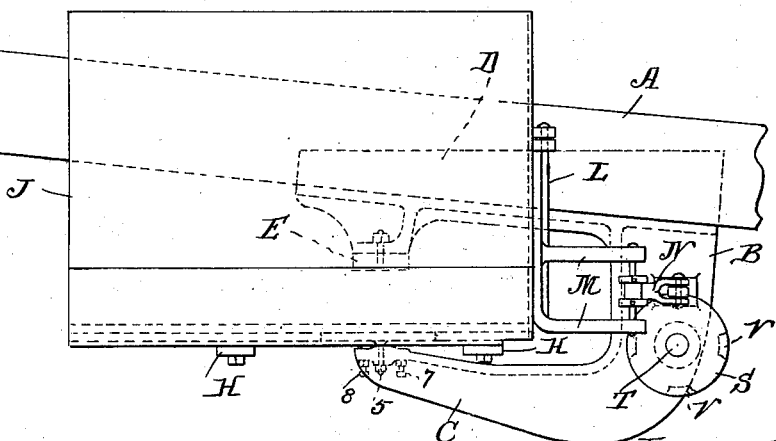

Referring to the accompanying drawings and to the various views and reference-signs appearing thereon, Figure 1 is a plan view of a construction embodying the features of improvement of my invention. Fig. 2 is a front end view of the same. Fig. 3 is a side elevation of the same. Fig. 4 is a detail view in section illustrating the means for adjusting the bottom plate of the feedway.

The same part is designated by the same reference-sign whenever it occurs throughout the several views.

In the application above referred to is shown, described, and claimed a construction of machine for making grass twine, wherein the grass to be formed into twine is deposited by hand or otherwise into a suitable tray or box, from which the grass is fed into position to be grasped by a series of grippers carried upon the periphery of a revolving carrier, the feed of the grass from the tray being in a line transverse to the plane in which the carrier operates. It is described in said application that previously to being placed in the tray or box the grass is suitably combed, so that the individual straws or stems of grass will be free from interlacing or tangles and will assume a position parallel with respect to each other. The grass thus prepared is placed in the box or tray with the butt-ends thereof all presented in one direction and resting against one of the end walls of the box or tray and with the top ends thereof all presented in the opposite direction. The present invention relates to a machine of this character, and the first feature of improvement to which attention will now be directed is in the provision of means for evening up the butt-ends of the stems or stalks of grass.

Referring to the accompanying drawings, reference-sign A designates a supporting-beam of the machine-frame, upon which is supported in any convenient manner the bracket B, having the lower arm C and an overhanging upper arm D. Rigidly bolted to the under surface of the free end of said upper arm D is the feeder-plate E, and suitably mounted upon the upper surface of the free end of arm C of bracket B and in a manner presently to be more fully explained are the bottom feeder-plates F G. Suitably supported upon the plate F are the arms H, upon which the tray or casing J is mounted. The grass after having been previously combed, if desired, is deposited into the tray or box J preparatory to being fed to the machine, with the butt-ends of the stems or stalks thereof all presented toward and resting against the end wall K of said box or tray, and in order to even said butt-ends said end wall K is made movable by being hinged or pivoted upon a vertical axis L, as clearly shown, (see Figs. 1, 2, and 3,) and said hinged wall is provided with lugs or extensions M beyond said pivot, and to the ends of said extensions is pivotally connected one end of a rod N, adjustable in length, if desired, as by mounting the threaded end of said rod in a threaded socket O. The other end of said rod N is connected to a bolt P, suitably mounted in bracket B and acted upon by a spring Q, the tension of which is normally exerted in a direction to project rod N endwise to hold the movable end wall K of box or tray J in closed position. Suitably bolted or otherwise formed on or secured to bolt P is a block R, arranged to bear against the surface of a disk S, suitably mounted upon a shaft T, adapted to be driven from any convenient rotating part of the machine. On the engaging face of disk S is formed a series of cam projections V. The operation of this feature of my invention is as follows: When the machine is put in operation, rotation is imparted to shaft T, thereby causing the cam projections V on disk S to engage and move block R in a direction to cause rod P to move against the resistance of spring Q, which spring operates to return said rod as soon as a cam projection V passes or clears the block R. By this means an endwise-reciprocatory movement is imparted to rod N, thereby vibrating the hinged end wall K of the box or tray about its pivot, which by impinging against the butt-ends of the stems or stalks of straw or grass causes the butt-ends of the stems or stalks of straw or grass to be evened up. It will be seen that the vibratory movement of the end wall K continues during the operation of the machine, and hence the stems or stalks of grass are maintained in proper and efficient condition to be presented evenly and uniformly to the twine-forming mechanism.

Of course many specifically-different forms of construction may be devised for imparting the vibrations or rocking movements to the end wall K of the tray, and therefore I do not desire to be limited or restricted to the specific construction shown and described for accomplishing this result. The construction shown, however, is simple and efficient in operation and answers the purpose, but is intended as merely illustrative of an operative construction embodying the principles of the invention.

From the tray or box J the grass is fed into the path of operation of the gripping-carrier and between the upper feeder-plate E and the lower feeder-plates G F. It sometimes happens that the stems or stalks of grass are much thicker at the butt-ends than at the top ends, and hence during the feed of the stems or stalks of grass between the upper and lower feeder-plates they will be held more firmly on the edges of the plates nearer the butt-ends than on the sides or edges toward the heads thereof. It is also apparent that the width or space between the upper feeder-plate E and the lower feeder-plates G F determines the thickness of the layer of grass as presented to the action of the grippers.

It is the special purpose of the next feature of my invention to provide a construction whereby the space between the upper and lower feeder-plates may be adjusted so as to adjust the thickness of the layer of grass as supplied to the grippers and also to provide an adjustment of said plates laterally with respect to each other, whereby compensation may be secured to accommodate the difference in size of the stems or stalks of grass at the butt-ends from the size thereof at the top ends, and hence to secure an even and efficient gripping action of the feeder-plates throughout the extent of contact thereof with the stems or stalks of grass, and also to provide an adjustment whereby the nippers may be permitted to enter more or less deeply into the grass. To secure these advantageous results, I provide a construction wherein the plane of the lower feeder-plates may be adjusted laterally with reference to the plane of the upper feeder-plate—that is, while the upper feeder-plate is rigidly held by being securely bolted to the under surface of the upper end of arm D of bracket B the lower feeder-plates are made adjustable laterally relative thereto. To this end I secure the lower plates G F to the upper surface of the lower arm C of bracket B by means of a bolt 5, arranged to pass through an elongated slot 6 in said arm C, and I tap through said arm C the set-screws 7 8, arranged on either side of the securing-bolt 5 and having their ends arranged to impinge against the under surface of feeder-plate F. In order that the head of bolt 5 may not form an obstruction to the feed of the grass, said head is arranged to be received in a countersink in the top surface of plate G, as clearly shown in Fig. 4. The set-nuts 9 of securing-bolt 5 are arranged to draw against a boss 10, as clearly shown in Fig. 4, and the upper surface of arm C is provided with a similar boss or projection 11 to receive the bearing of feeder-plate F, permitting said feeder-plate to be tilted thereon. By the construction thus described it will be seen that the angle of the lower feeder-plates G F may be changed or varied with respect to the upper feeder-plate E by turning up on one of the set-screws 7 8 and backing off the other. When the desired adjustment is secured, the set-screws are firmly held by the set-nuts 12, the elongated slot 6, through which the securing-bolt 5 passes, permitting of the angular adjustment of said feeder-plates, and when the desired adjustment is secured said feeder-plate is firmly clamped in position by turning up on the set-nuts of said securing-bolt. It will also be seen that by the construction described the space between the upper and lower feeder-plates may be adjustably regulated by moving said lower feeder-plates toward or from the upper plate, and in all positions of adjustment of said lower feeder-plates, whether bodily toward or from the upper feeder-plate or whether into tilted position relative to said upper feeder-plate, said lower feeder-plates may be rigidly clamped by properly setting up on the set-nuts of securing-bolt 5. By this construction the gripping action of the feeder-plates upon the stems or stalks of grass may be regulated and varied to accommodate the varying conditions of grass stems or stalks, thus materially improving the operation of the machine.

Many variations in the details of construction and arrangement would readily occur to persons skilled in the art and still fall within the spirit and scope of my invention. I do not desire, therefore, to be limited or restricted to the exact construction, location, and arrangement of parts shown and described; but, Having now set forth the object and nature of my invention and a form of apparatus embodying the principles thereof and having described the construction, function, and mode of operation of such apparatus, what I claim as new and useful and of my own invention, and desire to secure by Letters Patent, is—

1. In a machine of the class described, a feed box or tray having a hinged end wall, a rod connected to said hinged end wall, a spring normally acting to project said rod in a direction to close said end wall, and means for periodically moving said rod in the opposite direction against the action of said spring, whereby said end wall is vibrated, as and for the purpose set forth.

2. In a machine of the class described, a feed tray or box having a hinged end wall, a rod adjustably connected to said hinged wall, a disk having cam projections thereon arranged to periodically move said rod in a direction to rock said end wall, and a spring arranged to oppose the action of said cams, as and for the purpose set forth.

3. In a machine of the class described, a stationary upper feeder-plate, in combination with lower feeder-plates, a securing-bolt for the latter, and adjusting-screws arranged on opposite sides of said securing-bolt, whereby said lower feeder-plates may be adjusted toward or from the upper feeder-plate or angularly with respect thereto, as and for the purpose set forth.

4. In a machine of the class described, a bracket having an elongated slot therein, a feeder-plate, a securing-bolt therefor arranged to pass through said elongated slot, set-screws tapped through said bracket on opposite sides of said securing-bolt and arranged to impinge against said feeder-plate, whereby said feeder-plate may be adjusted bodily or angularly, in combination with a coöperating stationary feeder-plate, as and for the purpose set forth.

5. In an apparatus of the class described, feeder-plates forming a passage through which the material is fed, one of said plates being fixed, and means for adjustably tilting the other of said plates laterally and with respect to the fixed plate, whereby the angular relation of said plates laterally with respect to each other may be varied, as and for the purpose set forth.

6. In an apparatus of the class described, feeder-plates forming between the adjacent surfaces thereof, a passage through which the material is fed, and means for relatively adjusting said plates laterally to change the angle of inclination of said surfaces laterally with respect to each other, as and for the purpose set forth.

In witness whereof I have hereunto set my hand, this 22d day of April, 1899, in the presence of the subscribing witnesses.

JUDSON LATTIN.

Witnesses:
  H. BORUP,
  GRAHAM M. TORRANCE.